(12) United States Patent
Tanno

(10) Patent No.: US 12,151,521 B2
(45) Date of Patent: Nov. 26, 2024

(54) TIRE ASSEMBLY AND TIRE DEFORMATION STATE DETERMINATION SYSTEM

(71) Applicant: The Yokohama Rubber Co., LTD., Tokyo (JP)

(72) Inventor: Atsushi Tanno, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 725 days.

(21) Appl. No.: 16/768,859

(22) PCT Filed: Nov. 26, 2018

(86) PCT No.: PCT/JP2018/043328
§ 371 (c)(1),
(2) Date: Jun. 1, 2020

(87) PCT Pub. No.: WO2019/107297
PCT Pub. Date: Jun. 6, 2019

(65) Prior Publication Data
US 2021/0138852 A1    May 13, 2021

(30) Foreign Application Priority Data
Dec. 1, 2017   (JP) .................................. 2017-231432

(51) Int. Cl.
*B60C 23/00* (2006.01)
*B60C 19/00* (2006.01)
(Continued)

(52) U.S. Cl.
CPC .......... *B60C 23/064* (2013.01); *B60C 23/066* (2013.01); *G01D 5/145* (2013.01);
(Continued)

(58) Field of Classification Search
CPC ........ B60C 2019/004; B60C 2019/005; B60C 23/06; B60C 23/064; B60C 23/066; B60C 23/067; B60C 23/068
See application file for complete search history.

(56) References Cited

U.S. PATENT DOCUMENTS 4,724,703 A    2/1988   Neugebauer et al.
5,749,984 A    5/1998   Frey et al.
(Continued)

FOREIGN PATENT DOCUMENTS

CN    1619271      5/2005
EP    0 233 357    8/1987
(Continued)

OTHER PUBLICATIONS

Machine translation of JP 2006-64565, 2006.*
International Search Report for International Application No. PCT/JP2018/043328 dated Feb. 19, 2019, 4 pages, Japan.

*Primary Examiner* — Justin R Fischer
(74) *Attorney, Agent, or Firm* — Thorpe North & Western

(57) ABSTRACT

A tire assembly includes a tire and a shape measurement unit utilizing magnetism. The shape measurement unit is provided with one device of a magnetic generator or a magnetic sensor configured to detect a distance of separation from the magnetic generator based on a magnetic field generated by the magnetic generator to acquire a deformation state of a sidewall, in a first region that is any one of a tread-portion-corresponding region and bead-portion-corresponding regions that are on an inner surface of the tire, the tread-portion-corresponding region corresponding to a tread portion and the bead-portion-corresponding regions corresponding to bead portions, and is provided with another of the magnetic generator or the magnetic sensor in a second region.

22 Claims, 15 Drawing Sheets

(51) Int. Cl.
  *B60C 23/06* (2006.01)
  *G01D 5/14* (2006.01)
  *G01M 17/02* (2006.01)

(52) U.S. Cl.
  CPC ....... *G01M 17/02* (2013.01); *B60C 2019/004* (2013.01); *B60C 2019/005* (2013.01)

(56) References Cited

U.S. PATENT DOCUMENTS

| | | |
|---|---|---|
| 2003/0095050 A1 | 5/2003 | Mancosu et al. |
| 2005/0103100 A1 | 5/2005 | Miyoshi et al. |
| 2005/0159855 A1 | 7/2005 | Sugiura et al. |
| 2005/0217777 A1* | 10/2005 | Yukawa .................... B60B 3/04 152/381.6 |
| 2007/0222569 A1 | 9/2007 | Beranger et al. |
| 2007/0256485 A1 | 11/2007 | Rensel et al. |
| 2008/0011092 A1 | 1/2008 | Miyoshi et al. |
| 2008/0251172 A1 | 10/2008 | Robert et al. |
| 2009/0049903 A1 | 2/2009 | Murakami et al. |
| 2009/0277262 A1 | 11/2009 | Rensel et al. |

FOREIGN PATENT DOCUMENTS

| | | | |
|---|---|---|---|
| JP | H09-188113 | | 7/1997 |
| JP | 2003-520735 | | 7/2003 |
| JP | 2005-207811 | | 8/2005 |
| JP | 2006-64565 | * | 3/2006 |
| JP | 2006-240412 | * | 9/2006 |
| JP | 2006-327269 | | 12/2006 |
| JP | 2007-003242 | | 1/2007 |
| JP | 2007-091183 | | 4/2007 |
| JP | 2007-249964 | | 9/2007 |
| JP | 2009-535699 | | 10/2009 |
| JP | 2011-196774 | | 10/2011 |
| JP | 2012-122813 | | 6/2012 |
| KR | 10-2013-0067817 | | 6/2013 |
| WO | WO 01/54955 | | 8/2001 |
| WO | WO 2004/098910 | * | 11/2004 |
| WO | WO 2005/103626 | | 11/2005 |
| WO | WO 2007/040115 | | 4/2007 |
| WO | WO 2007/127220 | | 11/2007 |
| WO | WO 2005/028270 | * | 3/2015 |

* cited by examiner

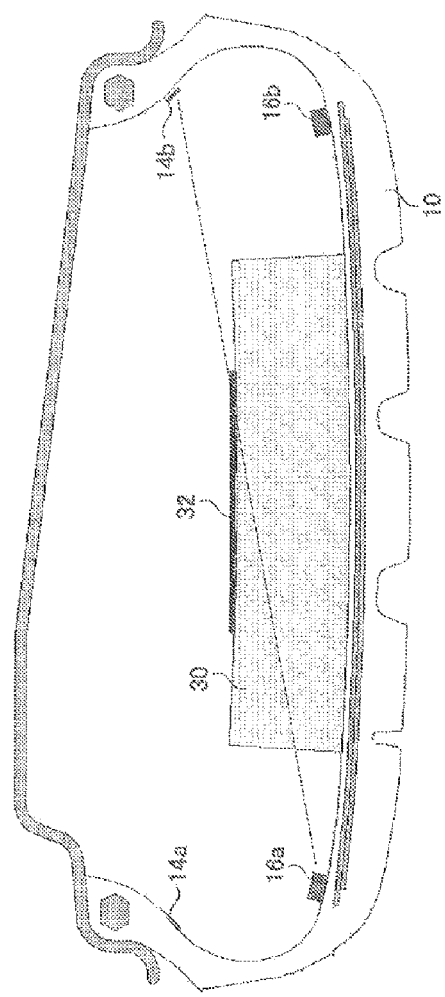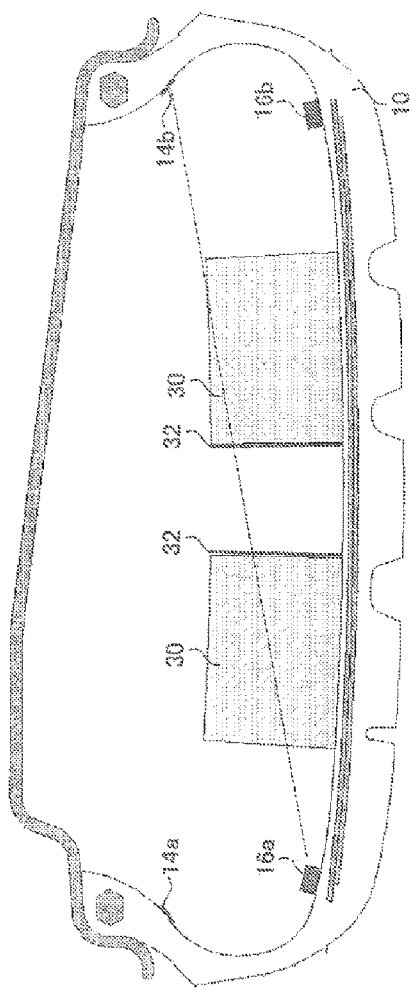

TIRE ASSEMBLY AND TIRE DEFORMATION STATE DETERMINATION SYSTEM

TECHNICAL FIELD

The present technology relates to a tire assembly including a magnetic sensor and a tire deformation state determination system for acquiring a deformation state of a sidewall of a tire.

BACKGROUND ART

Heretofore, vehicle behavior has been controlled at the time of steering a vehicle. A change in vehicle behavior in response to steering of a vehicle starts when force received by a tire from a road surface is transmitted to the vehicle. Such a change in behavior of the vehicle can be recognized using a sensor provided to the vehicle.

However, to limit unwanted behavior, control of the vehicle preferably starts at an early stage before detection of the vehicle behavior by the sensor provided to the vehicle, to prevent unwanted behavior from increasing.

For example, a known device can estimate, with high accuracy and a simple configuration, a ground contact state of a tire deformed based on a slip angle of the tire at the time of steering a vehicle (see Japan Unexamined Patent Publication No. 2006-327269).

The device includes: a rim reference member that is provided on a wheel that supports a tire, in a tread portion inner side facing region of the tire; a tread reference member that is provided at a position facing the rim reference member, on the inner side of the tread portion of the tire; and a state estimation unit that estimates the ground contact state of the tire based on a change in the positional relationship between the rim reference member and the tread reference member.

With the device described above, the tire ground contact state at the time of steering can be estimated based on a change in the positional relationship between the rim reference member and the tread reference member. Specifically, the orientation of the rim during steering serves as a reference orientation for the deformation of the tire with the slip angle. Thus, the ground contact state of the tire with the slip angle can be easily estimated by detecting a change in the positional relationship between the rim reference member and the tread reference member. With this configuration, the ground contact state of the contact patch of the tire can be recognized, but the deformation state of the sidewall cannot be determined. For example, deformation due to vertical deflection of the sidewall, lateral deformation, and the like cannot be determined. Thus, one cannot sufficiently recognize whether deformation of the sidewall is close to the deformation limit.

On top of that, since the device described above detects a change in the positional relationship between the rim reference member and the tread reference member, when the tire is mounted on the rim, the rim reference member and the tread reference member must be accurately positioned in alignment.

SUMMARY

The present technology provides a tire assembly and a tire deformation state determination system enabling easy acquisition of a deformation state of a sidewall.

One aspect of the present technology is a tire assembly including a first magnetic sensor configured to acquire a deformation state of a sidewall of a tire. The tire assembly includes:

a tire; and a measurement unit provided with a first magnetic generator and a first magnetic sensor configured to acquire the deformation state of the sidewall, the first magnetic generator being provided in a first region that is any one of a tread-portion-corresponding region and bead-portion-corresponding regions that are on an inner surface of the tire, the tread-portion-corresponding region corresponding to a tread portion of the tire and the bead-portion-corresponding regions corresponding to bead portions of the tire, the first magnetic sensor being provided in a second region that is one of the tread-portion-corresponding region and the bead-portion-corresponding regions and other than the first region, the first magnetic sensor being configured to detect a distance of separation from the first magnetic generator based on a magnetic field generated by the first magnetic generator.

Preferably, in addition to a first set of the first magnetic sensor and the first magnetic generator, one or more second sets of second magnetic sensors and second magnetic generators having similar configurations as the first magnetic sensor and the first magnetic generator are provided in the first region and the second region, and the first set and the one or more second sets are provided at an equal interval along a tire circumferential direction.

Preferably, the first magnetic generator is provided in a contact-patch-corresponding region that is on the inner surface of the tire and corresponds to a contact patch of the tread portion, and the first magnetic sensor is disposed on each of two positions in the bead-portion-corresponding regions on both sides in a tire lateral direction.

Preferably, R1 is a distance between a position of the first magnetic sensor in one of the bead-portion-corresponding regions on one of the sides in the tire lateral direction and a position of the first magnetic generator, R2 is a distance between a position of the first magnetic sensor provided in one of the bead-portion-corresponding regions on an other one of the sides in the tire lateral direction and the position of the first magnetic generator, and a ratio R1/R2 is equal to or greater than 0.67 and equal to or less than 1.5.

Preferably, a position of the first magnetic sensor in a tire circumferential direction is identical to a position of the first magnetic generator in the tire circumferential direction.

Preferably, the two positions are different from each other in a tire circumferential direction, and the first magnetic generator is provided between the two positions in the tire circumferential direction.

Preferably, the first magnetic sensor is provided in one of the bead-portion-corresponding regions on one of the sides in a tire lateral direction at each position of two positions different from each other in a tire circumferential direction, and the first magnetic generator is provided in the tread-portion-corresponding region between the two positions in the tire circumferential direction.

Preferably, the first magnetic sensor provided at each position of the two positions is configured to detect distances of separation from the first magnetic generator, based on a common magnetic field generated by the first magnetic generator.

Preferably, the first magnetic generator is provided in a land-portion-corresponding region corresponding to a land portion where the tread portion contacts a road surface.

Preferably, the first magnetic sensor and the first magnetic generator are provided on one side of an equator line of the tire in a tire lateral direction, a first device that is one of the first magnetic sensor and the first magnetic generator is provided within a range between a first corresponding position on the inner surface of the tire and a second corresponding position on the inner surface of the tire, the first corresponding position being separated from a belt end that is an outermost portion of a belt of the tire in the tire lateral direction, toward an inner side in the tire lateral direction by 30 mm, the second corresponding position corresponding to a pattern end of the tire, and a second device that is one of the first magnetic sensor and the first magnetic generator and other than the first device is provided within a range in the inner surface along a tire radial direction, between a bead distal end that is an innermost position of the tire in the tire radial direction and a position at a height that is 35% of a tire cross-sectional height from the bead distal end in the tire radial direction.

Preferably, a sound absorbing member made of foamed urethane resin is fixed to the tread-portion-corresponding region, a set A of the first magnetic sensor and the first magnetic generator and a set B of a third magnetic sensor and a third magnetic generator having similar configurations as the set A of the first magnetic sensor and the first magnetic generator are provided at sides of the inner surface of the tire opposite to each other in the tire lateral direction respectively, and the sound absorbing member is provided with a magnetic field shielding material that avoids mixing the magnetic fields corresponding to the set A and the set B.

Preferably, the magnetic field shielding material is provided at least in a first region of the sound absorbing member, the first region extending on a straight line that connects a position of the first magnetic generator of the set A and a position of the third magnetic sensor of the set B, and in a second region of the sound absorbing member, the second region extending on a straight line that connects a position of the third magnetic generator of the set B and a position of the first magnetic sensor of the set A.

Preferably, the first magnetic sensor is provided on a substrate, and an angle between a normal direction of the substrate and a straight line direction connecting the first magnetic generator and the first magnetic sensor is 0 to 60 degrees.

Preferably, at least one device of the first magnetic generator and the first magnetic sensor is fixed to one of the tread-portion-corresponding region and the bead-portion-corresponding regions via a base.

One embodiment of the present technology is also a tire assembly including a magnetic sensor configured to acquire a deformation state of a sidewall of a tire. The tire assembly includes:

a tire; and a measurement unit provided with a magnetic generator and a group of magnetic sensors configured to acquire the deformation state of the sidewall, the magnetic generator being provided in a tread-portion-corresponding region that is on an inner surface of the tire and corresponds to a tread portion of the tire, the group of magnetic sensors being provided in bead-portion-corresponding regions that are on the inner surface of the tire and correspond to a bead portion of the tire, the group of magnetic sensors being configured to detect a distance of separation from the magnetic generator based on a magnetic field generated by the magnetic generator.

The group of magnetic sensors include at least a first magnetic sensor, a second magnetic sensor, and a third magnetic sensor, the first magnetic sensor and the second magnetic sensor being provided on one side in a tire lateral direction, the third magnetic sensor being provided on an other side in the tire lateral direction, and the first magnetic sensor and the second magnetic sensor are provided on different sides in a tire circumferential direction with respect to a position of the magnetic generator in the circumferential direction.

Also, another aspect of the present technology is a tire deformation state determination system. The tire deformation state determination system includes:

the tire assembly; and a determination device configured to determine a deformation state of the sidewall of the tire based on a detection signal output from the magnetic sensor or the group of magnetic sensors, the tire assembly comprising:

a tire; and a measurement unit provided with a magnetic generator and a magnetic sensor configured to acquire the deformation state of the sidewall, the magnetic generator being provided in a first region that is any one of a tread-portion-corresponding region and bead-portion-corresponding regions that are on an inner surface of the tire, the tread-portion-corresponding region corresponding to a tread portion of the tire and the bead-portion-corresponding regions corresponding to bead portions of the tire, the magnetic sensor being provided in a second region that is one of the tread-portion-corresponding region and the bead-portion-corresponding regions and other than the first region, the magnetic sensor being configured to detect a distance of separation from the magnetic generator based on a magnetic field generated by the magnetic generator Preferably, the determination device is configured to determine, as the deformation state of the sidewall, at least one type of deformation including: vertical deformation corresponding to vertical deflection of the sidewall; lateral deformation corresponding to deformation of the sidewall in a tire lateral direction; twisting deformation of the sidewall due to the tread portion being twisted about a tire rotational axis; and twisting deformation of the sidewall due to the tread portion being twisted about an axis orthogonal to a contact patch of the tire and orthogonal to the tire rotational axis.

With the tire assembly and the tire deformation state determination system described above, the deformation state of the sidewall can be easily acquired.

BRIEF DESCRIPTION OF DRAWINGS

FIGS. 15A and 15B are diagrams illustrating other examples of arrangement modes of sound absorbing member(s), magnetic sensors, and magnetic generators according to an embodiment.

DETAILED DESCRIPTION

A tire assembly and a tire deformation state determination system according to the present embodiment will be described in detail below.

In the present specification, "tire lateral direction" refers to the direction of the center axis of rotation of a pneumatic tire. "Tire circumferential direction" refers to a rotation direction in which a tread surface rotates, when the tire rotates about the center axis of rotation of the tire. "Tire radial direction" refers to the direction radiating from the center axis of rotation of the tire. "Toward the outside in the tire radial direction" refers to the direction away from the tire rotation center axis. "Toward the inside in the tire radial direction" refers to the direction towards the center axis of rotation of the tire.

Figure 1:
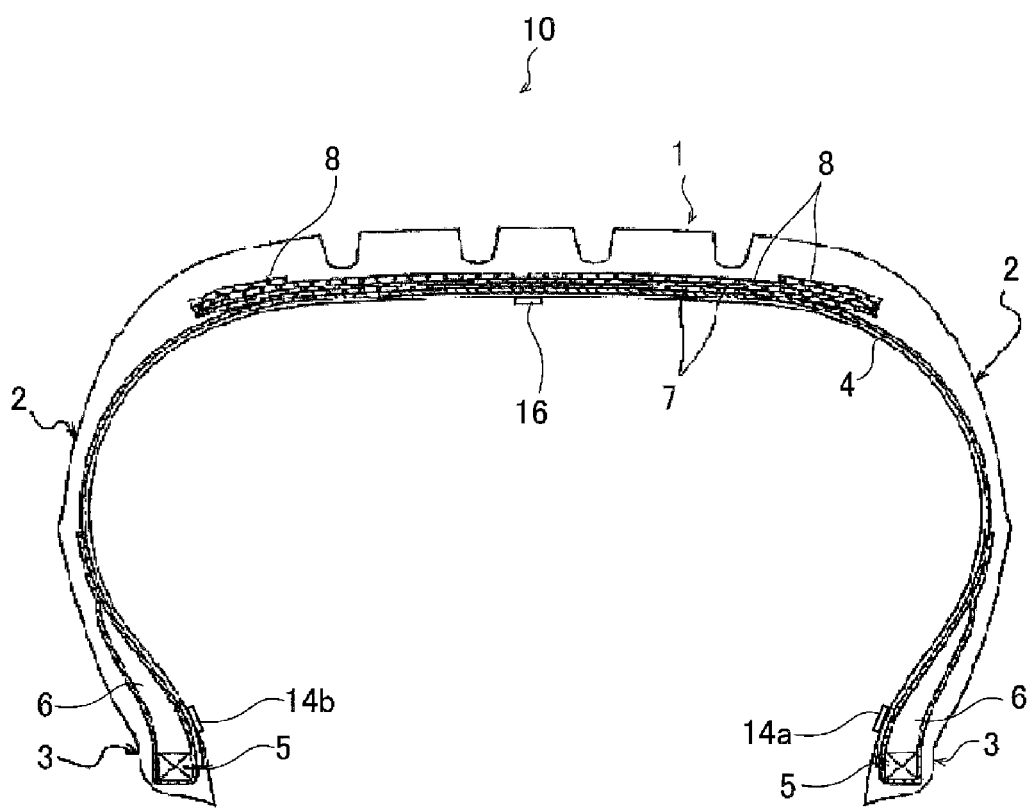
FIG. 1 is a profile cross-sectional view of a pneumatic tire according to one embodiment.

FIG. 1 is a profile cross-sectional view of a pneumatic tire according to one embodiment. A pneumatic tire 10 illustrated in FIG. 1 includes an annular tread portion 1 extending in a tire circumferential direction, a pair of sidewall portions 2, 2 disposed on both sides of the tread portion 1, and a pair of bead portions 3, 3 disposed inward of the corresponding sidewall portions 2 in the tire radial direction.

A carcass layer 4 is mounted between the pair of bead portions 3, 3. The carcass layer 4 includes a plurality of reinforcing cords extending in a tire radial direction or a tire lateral direction and is folded back around bead cores 5 disposed in each of the bead portions 3 from a tire inner side to a tire outer side. A bead filler 6 extending radially outward, having a triangular cross-sectional shape, formed from a rubber composition, is disposed on the outer circumference of the bead core 5.

A plurality of belt layers 7 are embedded radially toward the outside of the carcass layer 4 in the tread portion 1. The belt layers 7 each include a plurality of reinforcing cords that are inclined with respect to the tire circumferential direction, the reinforcing cords being arranged in the different layers in a criss-cross manner. In the belt layers 7, the inclination angle of the reinforcing cords with respect to the tire circumferential direction ranges from, for example, 10° to 40°. Steel cords are preferably used as the reinforcing cords of the belt layers 7. To improve high-speed durability, at least one belt cover layer 8 is disposed radially toward the outside of the belt layer 7, the belt cover layer 8 being formed by arraying reinforcing cords at an angle of 5° or less, for example, from the tire circumferential direction. Nylon, aramid, or similar organic fiber cords are preferably used as the reinforcing cords of the belt cover layers 8.

Note that the tire internal structure described above represents a typical example for a pneumatic tire, and the pneumatic tire is not limited thereto.

Figure 2:
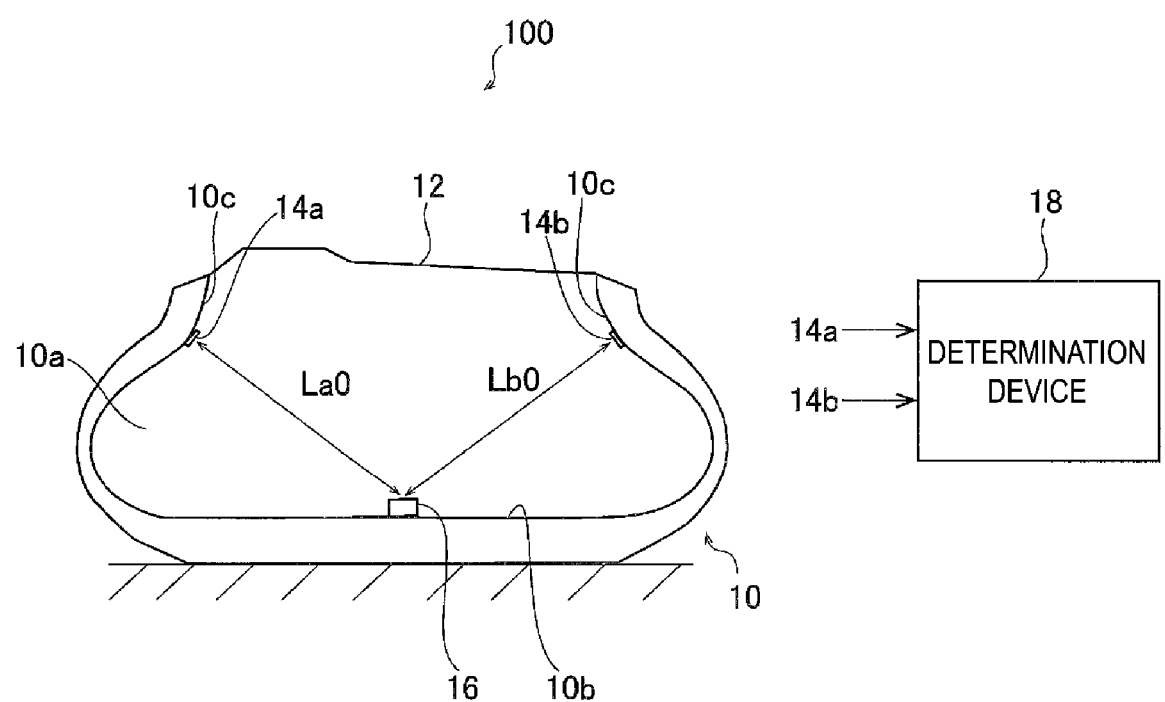
FIG. 2 is a diagram illustrating a schematic configuration of a tire deformation state determination system according to one embodiment.

FIG. 2 is a diagram illustrating a schematic configuration of a tire deformation state determination system 100 according to one embodiment.

The tire deformation state determination system 100 includes a tire 10, magnetic sensors 14a, 14b, a magnetic generator 16, and a determination device 18. The magnetic sensors 14a, 14b and the magnetic generator 16 form a measurement unit.

The tire 10 is a pneumatic tire and is mounted on a wheel 12. The magnetic sensors 14a, 14b and the magnetic generator 16 are provided in a tire cavity region 10a defined by the tire 10 and the wheel 12.

The magnetic generator 16 is an instrument that generates magnetism. As the magnetic generator 16, a magnet such as a neodymium magnet or an electromagnet is used. The magnetic generator 16 is provided, for example, with an arrangement direction of the N and S poles extending along the tire radial direction, with no inclination angle relative to the tire circumferential direction. The magnetic generator 16 is fixed to a tread-portion-corresponding region 10b. The tread-portion-corresponding region 10b is a region of the inner surface of the tire 10 corresponding to the tread portion 1. This inner surface faces the tire cavity region 10a. The tread portion 1 is a region in which tread rubber is disposed. In the tire 10 with a tread pattern, the tread portion 1 is a region between the pattern ends of the tread patterns on both sides in the tire lateral direction.

How the magnetic generator 16 is fixed to the tread-portion-corresponding region 10b is not particularly limited. For example, the magnetic generator 16 may be fixed to the tread-portion-corresponding region 10b using a hook-and-loop-fastener. In such a case, one of a hook surface or a loop surface of the hook-and-loop-fastener is provided to the tread-portion-corresponding region 10b and the other one is provided to the magnetic generator 16 in the manufacturing process of the tire 10.

The magnetic sensors 14a, 14b are sensors capable of detecting a distance of separation from the magnetic generator 16. As the magnetic sensors 14a, 14b, for example, a Hall element utilizing the Hall effect, a magnetoresistive effect element, a magnetic impedance element, a GSR sensor element, a magnetostrictive sensor element, or the like can be used. A Hall element is particularly preferable to be used due to its capability of detecting the orientation of the magnetism traveling from the north pole to the south pole.

As illustrated in FIG. 2, the magnetic sensors 14a, 14b are provided in respective bead-portion-corresponding regions 10c on both sides in the tire lateral direction. The bead-portion-corresponding regions 10c are regions of the inner surface of the tire 10 corresponding to the bead portions. This inner surface faces the tire cavity region 10a. The bead portions are regions where bead cores 5 and bead fillers 6 are disposed.

Figure 3:
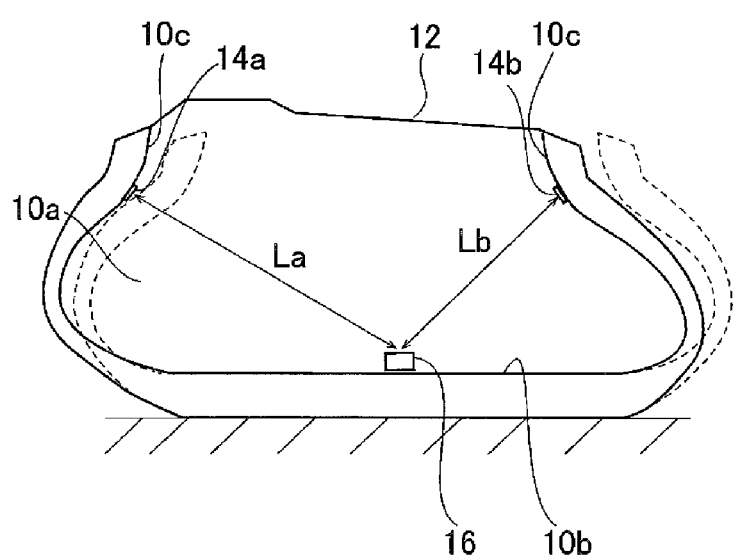
FIG. 3 is a diagram illustrating an example of a laterally deformed state of a sidewall.

In the example illustrated in FIGS. 2 and 3, the positions of the magnetic sensors 14a, 14b in the tire circumferential direction are identical to the position of the magnetic generator 16 in the tire circumferential direction.

The magnetic sensors 14a, 14b are provided on a substrate, for example. How this substrate is fixed to the bead-portion-corresponding region 10c is not particularly limited. For example, the magnetic sensors 14a, 14b may be fixed to the bead-portion-corresponding regions 10c using a hook-and-loop-fastener. In such a case, one of a hook surface or a loop surface of the hook-and-loop-fastener is provided to the bead-portion-corresponding regions 10c and the other one is provided to the magnetic sensors 14a, 14b in the manufacturing process of the tire 10.

With the magnetic sensors 14a, 14b, the distance La, Lb between the magnetic generator 16 and the magnetic sensors 14a, 14b can be obtained based on the level of magnetism. Thus, by detecting the distances La, Lb (see FIG. 3) obtained by the two magnetic sensors 14a, 14b, the deformation mode of the sidewall portion 2 can be determined.

The determination device 18 receives detection signals indicating the distances La, Lb transmitted from the magnetic sensors 14a, 14b through wired or wireless communications. Then, the determination device 18 determines whether the sidewall portion 2 is vertically or laterally deformed based on the information about the distances La, Lb. FIG. 3 is a diagram illustrating an example of a laterally deformed state of the sidewall portion 2.

FIG. 3 illustrates a state where the tire 10 is laterally deformed with respect to the road surface, due to the wheel 12 being shifted in the left direction in the figure. In this state, the distance La illustrated in FIG. 3 is greater than a reference distance La0 without the lateral deformation illustrated in FIG. 2, and the distance Lb illustrated in FIG. 3 is smaller than a reference distance Lb0 without the lateral deformation illustrated in FIG. 2.

When the sidewall portion 2 deforms due to vertical deflection caused by the increase in the load acting on the tire 10 in this state where the lateral deformation is occurring, the distances La, Lb illustrated in FIG. 3 will both be smaller than the distances La0, Lb0 illustrated in FIG. 2.

Thus, by acquiring the information about the distances La, Lb illustrated in FIG. 3 and comparing these distances with the distances La0, Lb0 illustrated in FIG. 2, the determination device 18 can determine deformation due to vertical deflection or lateral deformation of the sidewall portion 2. Specifically, the determination device 18 checks whether $\Delta La$ and $\Delta Lb$ are of positive or negative values. These $\Delta La$ and $\Delta Lb$ are results of subtracting the reference distances La0, Lb0 illustrated in FIG. 2 from the distances La, Lb after deformation as illustrated in FIG. 3. The determination device 18 determines that the sidewall portion 2 is vertically deformed when the distances $\Delta La$, $\Delta Lb$ are greater than or smaller than 0, and determines that the sidewall portion 2 is laterally deformed when the distance $\Delta La > 0 > \Delta Lb$ or the distance $\Delta Lb > 0 > \Delta La$ holds true.

Furthermore, the determination device 18 can determine the level of deformation based on whether $\Delta La$ and $\Delta Lb$ are of positive or negative values, and on the absolute values of $\Delta La$ and $\Delta Lb$.

In the example illustrated in FIGS. 2 and 3, the positions of the magnetic sensors 14a, 14b in the tire circumferential direction are identical to the position of the magnetic generator 16 in the tire circumferential direction. Alternatively, these elements may be at positions different from each other in the tire circumferential direction.

Figure 4A:
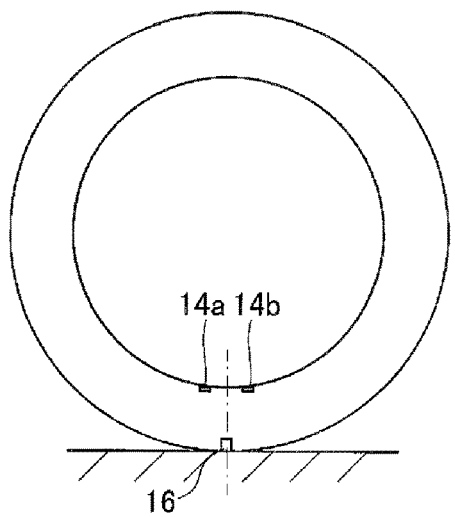
FIGS. 4A and 4B are diagrams illustrating arrangements of magnetic sensors according to one embodiment.
Figure 4B:
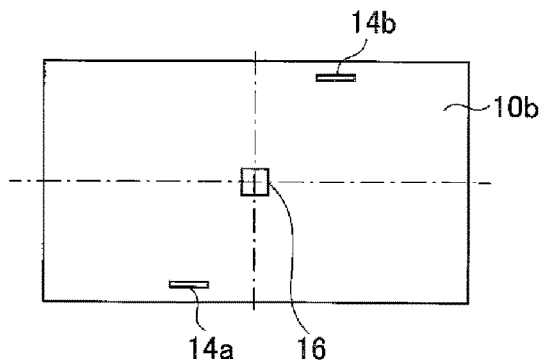

FIGS. 4A and 4B are diagrams illustrating an arrangement of the magnetic sensors 14a, 14b that are provided at different positions in the tire circumferential direction, according to one embodiment.

In the example illustrated in FIGS. 4A and 4B, the magnetic sensors 14a, 14b are provided with the magnetic generator 16 located between the two positions of the magnetic sensors 14a, 14b in the tire circumferential direction. Specifically, the magnetic sensors 14a, 14b are provided on both sides of the magnetic generator 16 (different sides) in the tire circumferential direction.

With the magnetic sensors 14a, 14b thus arranged, the determination device 18 can determine, based on the detection signals, vertical deformation of the sidewall portion 2, lateral deformation corresponding to deformation of the sidewall portion 2 in the tire lateral direction, and twisting deformation about the tire rotational axis. Furthermore, the determination device 18 can determine the level of deformation based on the detection signals. The twisting deformation about the tire rotational axis is a deformation due to the tread portion 1 being twisted in the tire circumferential direction with respect to the wheel 12.

The distance between the tire circumferential direction positions of the magnetic sensors 14a, 14b along the tire circumferential direction (distance in a non-ground contact state) is preferably 10 to 80% of the contact patch length of the tire 10. When this distance is less than 10% and greater than 80% of the contact patch length, deterioration of the SN ratio of the detection signals and the like occur, disabling sufficient determination of deformation in the contact patch of the sidewall portion 2 based on the detection signals from the magnetic sensors 14a, 14b. The contact patch length of the tire 10 is the maximum length in the tire circumferential direction of the contact patch of the tire 10 in contact with a flat surface, when the tire 10 is mounted on a regular rim and inflated to a regular internal pressure, and placed vertically upon the flat surface with a regular load applied thereto. Note that "Regular rim" is a rim defined by a standard for each tire according to a system of standards that includes standards on which tires are based, and refers to a "standard rim" in the case of Japan Automobile Tyre Manufacturers Association (JATMA), refers to a "Design Rim" in the case of Tire and Rim Association (TRA), and refers to a "Measuring Rim" in the case of European Tyre and Rim Technical Organisation (ETRTO). Note that "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUSIOLD INFLATION PRESOURES" in the case of TRA, and refers to the "INFLATION PRESOURE" in the case of ETRTO. The "Regular internal pressure" may be, for example, 180 kPa when the tire is for a passenger vehicle. Note that "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUSIOLD INFLATION PRESOURES" in the case of TRA, and refers to "LOAD CAPACITY" in the case of ETRTO. The "Regular load" may be, for example, 88% of the load when the tire is for a passenger vehicle.

Figure 4C:
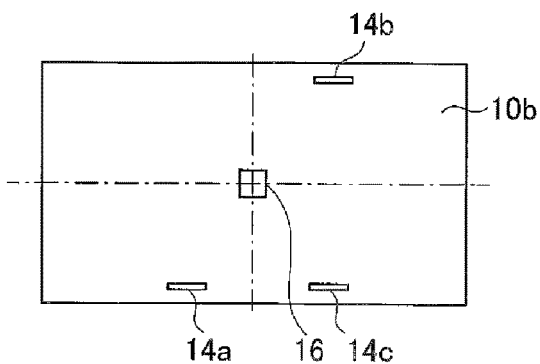
FIG. 4C is a diagram illustrating an arrangement of magnetic sensors according to another embodiment.
Figure 5A:
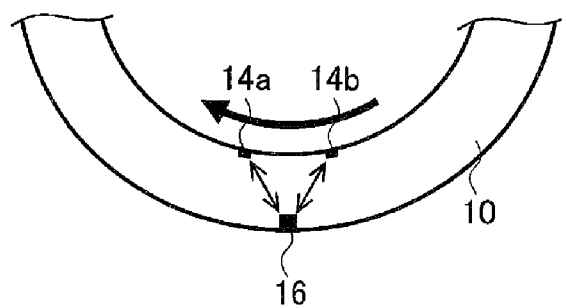
FIG. 5A is a diagram illustrating a deformation mode of a tread-portion-corresponding region under twisting deformation 1.
Figure 5B:
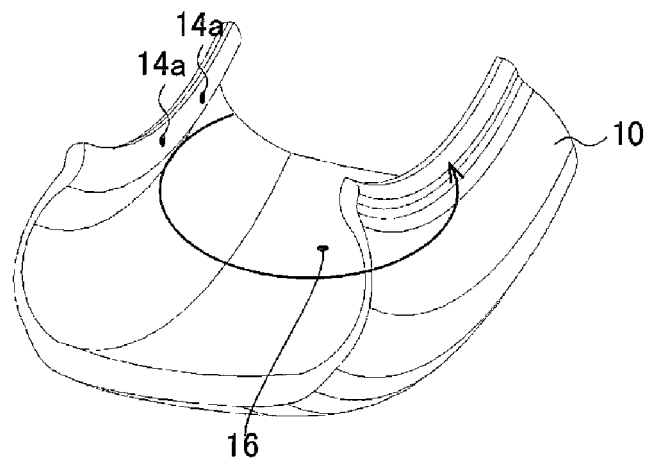
FIG. 5B is a diagram illustrating a deformation mode of the tread-portion-corresponding region under twisting deformation 2, using a shifting direction (indicated by an arrow) with respect to a wheel.

As illustrated in FIG. 4C, it is also preferable to provide a magnetic sensor 14c in the bead-portion-corresponding region 10c in addition to the magnetic sensors 14a, 14b. FIG. 4C is a diagram illustrating an arrangement of magnetic sensors according to one embodiment. In this case, the magnetic sensor 14c may be provided in the bead-portion-corresponding region 10c to be on the same side as the magnetic sensor 14a in the tire lateral direction, or may be provided in the bead-portion-corresponding region 10c to be on the same side as the magnetic sensor 14b in the tire lateral direction. In the example illustrated in FIG. 4C, the magnetic sensor 14c is provided in the bead-portion-corresponding region 10c to be on the same side as the magnetic sensor 14a in the tire lateral direction, and the magnetic sensors 14a, 14b are provided at two different positions in the tire circumferential direction. The magnetic generator 16 is provided in the tread-portion-corresponding region 10b to be between the two positions of the magnetic sensors 14a, 14b in the tire circumferential direction. In this case, the magnetic sensor 14c is preferably provided at the same position as the magnetic sensor 14b (or the magnetic sensor 14a) in the tire circumferential direction. This enables the determination of the vertical deformation representing vertical deflection of the sidewall portion 2, lateral deformation representing a deformation of the sidewall portion 2 in the tire lateral direction, twisting deformation of the sidewall portion 2 (twisting deformation 1) due to the tread portion 1 being twisted about the tire rotational axis, and twisting deformation (twisting deformation 2) of the sidewall portion 2 due to the tread portion 1 being twisted about an axis orthogonal to the contact patch of the tire and to the tire rotational axis. FIG. 5A is a diagram illustrating a deformation mode of the tread-portion-corresponding region 10b under the twist deformation 1. FIG. 5B is a diagram illustrating a deformation mode of the tread-portion-corresponding region 10b under the twist deformation 2. The modes are described using a shifting direction (indicated by an arrow) with respect to the contact patch.

The arrangement mode of the magnetic sensors illustrated in FIGS. 4A, 4B, and 4C enables the determination of any of these twisting deformation 1 and twisting deformation 2 as well as deformation due to vertical deflection and lateral deformation (the determination also including determination of the level of deformation).

The arrangement mode illustrated in FIGS. 4A and 4B enables the determination device 18 to distinctively determine deformation due to vertical deformation and lateral deformation. The mode illustrated in FIG. 4C enables the determination of deformation due to vertical deflection, lateral deformation, twisting deformation 1, and the twisting deformation 2.

As illustrated in FIG. 3 and FIGS. 4A to 4C, the magnetic sensors 14a, 14b provided at the two respective positions are configured to detect the distance of separation from the magnetic generator 16 based on the common magnetic field produced by the magnetic generator 16.

Figure 6A:
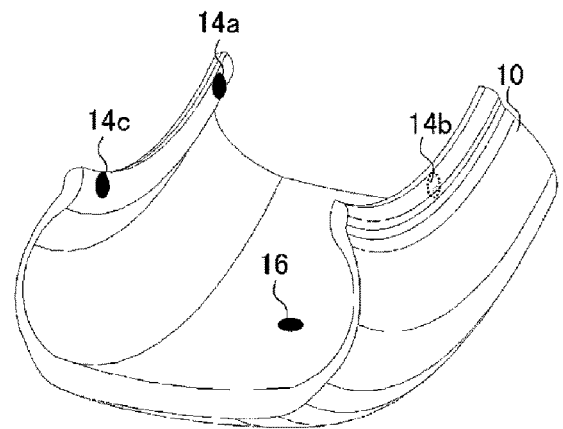
FIGS. 6A to 6C are diagrams illustrating examples of arrangement modes of magnetic sensors according to an embodiment.
Figure 6B:
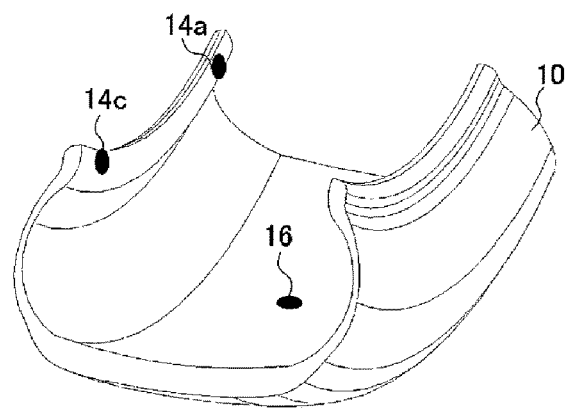
Figure 6C:
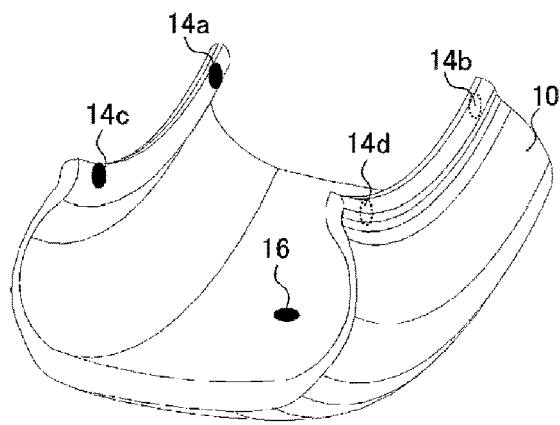

FIGS. 6A to 6C are diagrams illustrating examples of arrangement modes of magnetic sensors according to other embodiments. In FIGS. 6 to 8, the magnetic sensors and magnetic generators are simplified to be illustrated. Specifically, the black circles represent these elements.

FIG. 6A illustrates an arrangement mode in which the magnetic sensors 14a, 14c are provided at different positions in the tire circumferential direction and the magnetic sensor 14b is provided at the same position as the magnetic generator 16 in the tire circumferential direction. The magnetic generator 16 is provided in the tread-portion-corresponding region 10b to be between the two positions of the magnetic sensors 14a, 14c in the tire circumferential direction. This mode enables the determination of deformation due to vertical deflection, lateral deformation, and twisting deformation 1.

FIG. 6B illustrates a mode in which the magnetic sensors 14a, 14c are provided in the bead-portion-corresponding region 10c on one side in the tire lateral direction, to be on both sides of the magnetic generator 16 in the tire circumferential direction. Specifically, the magnetic sensors 14a, 14c are provided on the same side in the bead-portion-corresponding region 10c, among the bead-portion-corresponding regions 10c on both sides in the tire lateral direction, to be at two different positions in the tire circumferential direction. The magnetic generator 16 is provided in the tread-portion-corresponding region 10b to be between the two positions of the magnetic sensors 14a, 14c in the tire circumferential direction. Such a mode enables determination of the twisting deformation 1.

FIG. 6C illustrates a mode in which the magnetic sensors 14a, 14c are provided in the bead-portion-corresponding region 10c on the same side in the tire lateral direction, the magnetic sensor 14b and a magnetic sensor 14d are provided in the bead-portion-corresponding region 10c on the side opposite to that with the magnetic sensors 14a, 14c, and the magnetic sensors 14a to 14d are arranged as a set of the magnetic sensors 14a, 14b and a set of the magnetic sensors 14c and 14d provided on both sides of the position of the magnetic generator 16 in the tire circumferential direction. Specifically, the magnetic sensors 14a, 14c are provided at two different positions in the tire circumferential direction and the magnetic sensors 14b, 14d are also provided at two different positions in the tire circumferential direction. The magnetic generator 16 is provided between the two positions of the magnetic sensors 14a, 14b in the tire circumferential direction and between the two positions of the magnetic sensors 14c, 14d in the tire circumferential direction. This mode enables determination of deformation due to vertical deflection, the lateral deformation, the twisting deformation 1, and the twisting deformation 2.

In the modes illustrated in FIGS. 6A to 6C, each of the magnetic sensors 14a, 14c, the magnetic sensors 14a to 14c, and the magnetic sensors 14a to 14d are configured to detect the distance of separation from the magnetic generator 16 based on the common magnetic field generated by the magnetic generator 16.

Figure 7B:
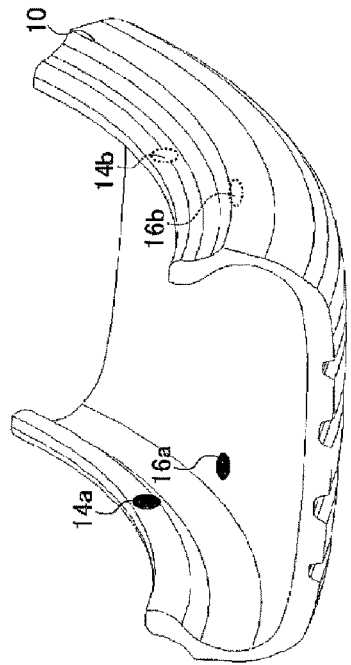
FIGS. 7A to 7D are diagrams illustrating examples of arrangement modes of magnetic sensors in a case where two or more magnetic generators are used, according to an embodiment.
Figure 7D:
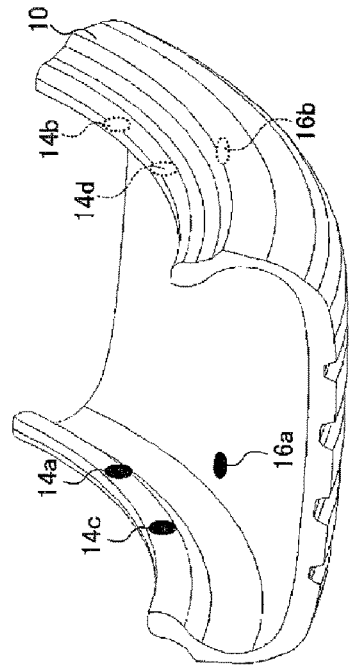
Figure 7A:
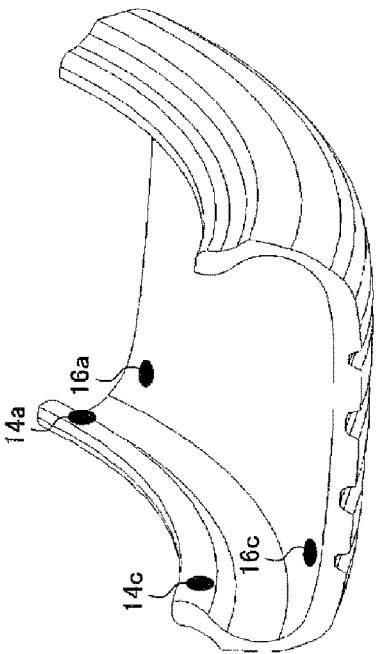

FIGS. 7A to 7D are diagrams illustrating examples of arrangement modes of magnetic sensors in a case where two or more magnetic generators 16a, 16c or magnetic generators 16a, 16b are used. These examples can be suitably applied to tires with a low-flat ratio that is 55% or less. FIG. 7A illustrates an arrangement mode in which the magnetic generators 16a, 16b are provided close to the sidewall portion 2 in the tread-portion-corresponding region 10b and at different positions in the tire circumferential direction, and the magnetic sensors 14a, 14c are provided in the bead-portion-corresponding region 10c to be at positions that are respectively identical to those of the magnetic generators 16a, 16c in the tire circumferential direction. The magnetic sensor 14a is configured to detect the distance of separation from the magnetic generator 16a based on a magnetic field generated by the magnetic generator 16a. The magnetic sensor 14c is configured to detect the distance of separation from the magnetic generator 16c based on a magnetic field generated by the magnetic generator 16c. Such a mode enables determination of the twisting deformation 1.

FIG. 7B illustrates an arrangement mode in which the magnetic generators 16a and 16b are provided in the tread-portion-corresponding region 10b to be at the same positions in the tire circumferential direction, and to be provided close to the respective sidewall portions 2 on both sides in the tire lateral direction facing each other. The magnetic sensors 14a, 14b are provided in the respective bead-portion-corresponding regions 10c that face each other, to be at positions that are respectively identical to those of the magnetic generators 16a and 16b in the tire circumferential direction. The magnetic sensor 14a is configured to detect the distance of separation from the magnetic generator 16a based on a magnetic field generated by the magnetic generator 16a. The magnetic sensor 14b is configured to detect the distance of separation from the magnetic generator 16b based on a magnetic field generated by the magnetic generator 16b. Such a mode enables determination of the lateral deformation.

Figure 7C:
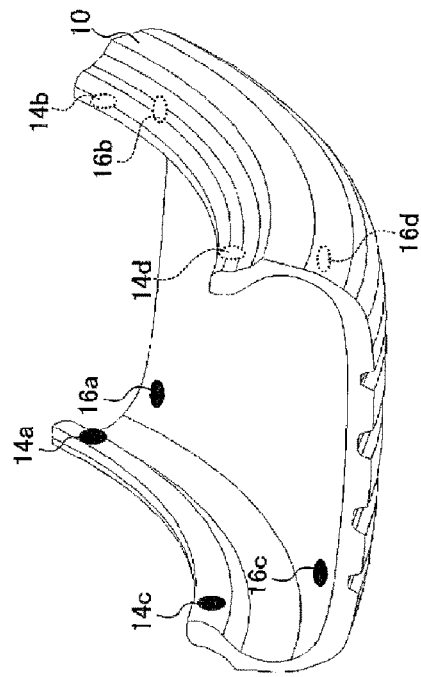
Figure 8:
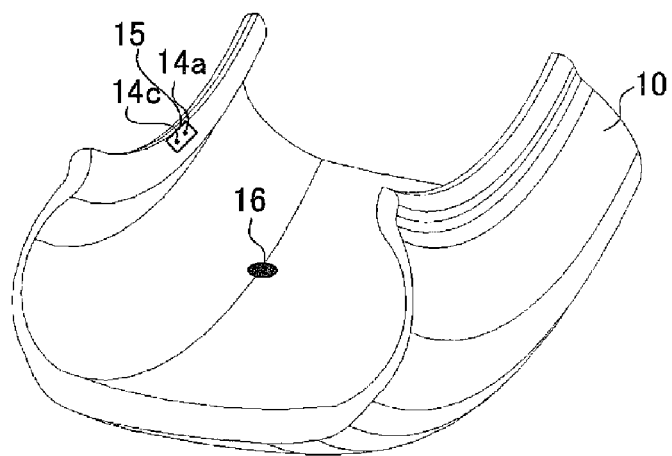
FIG. 8 is a diagram illustrating another example of an arrangement mode of two magnetic sensors according to one embodiment.

FIG. 7C illustrates an arrangement mode in which the magnetic generators 16a, 16b are provided at positions different from those of the magnetic generators 16c, 16d in the tire circumferential direction. The magnetic generators 16a, 16c are provided in the tread-portion-corresponding region 10b to be close to the sidewall portion 2 and at the same positions in the tire lateral direction. The magnetic generators 16b, 16d are provided in the tread-portion-corresponding region 10b to be close to the different lateral direction sidewall portion 2 to face the magnetic generators 16a, 16c in the tire lateral direction. The magnetic generators 16b, 16d are provided at the same position in the tire lateral direction. The magnetic sensors 14a to 14d are provided in the respective bead-portion-corresponding regions 10c to be at positions that are respectively identical to those of the magnetic generators 16a to 16d in the tire circumferential direction. The magnetic sensor 14a is configured to detect the distance of separation from the magnetic generator 16a based on a magnetic field generated by the magnetic generator 16a. The magnetic sensor 14b is configured to detect the distance of separation from the magnetic generator 16b based on a magnetic field generated by the magnetic generator 16b. The magnetic sensor 14c is configured to detect the distance of separation from the magnetic generator 16c based on a magnetic field generated by the magnetic generator 16c. The magnetic sensor 14d is configured to detect the distance of separation from the magnetic generator 16d based on a magnetic field generated by the magnetic generator 16d. Such a mode enables determination of the lateral deformation and the twisting deformation 2.

FIG. 7D illustrates an arrangement mode in which the magnetic sensors 14a, 14c are arranged with the arrangement mode illustrated in FIG. 6A, with the magnetic sensors 14b, 14d further provided in the bead-portion-corresponding region 10c facing the bead-portion-corresponding region 10c including the magnetic sensors 14a, 14c. The position of the magnetic sensor 14b in the tire circumferential direction is identical to the position of the magnetic sensor 14a in the tire circumferential direction. The position of the magnetic sensor 14d in the tire circumferential direction is identical to the position of the magnetic sensor 14c in the tire circumferential direction. The magnetic sensors 14a, 14c are provided in the bead-portion-corresponding region 10c to be at two different positions in the tire circumferential direction.

The magnetic sensors 14b, 14d are provided in the bead-portion-corresponding region 10c to be at two different positions in the tire circumferential direction. The magnetic generators 16a, 16b are each provided in the tread-portion-corresponding region 10b to be between the two corresponding positions in the tire circumferential direction. The magnetic generators 16a, 16b are provided in the tread-portion-corresponding region 10b to be close to the respective sidewall portions 2. The magnetic generators 16a, 16b are respectively provided between the positions of the magnetic sensors 14a, 14c and between the positions of the magnetic sensors 14b, 14d in the tire circumferential direction. The magnetic sensors 14a, 14c are configured to detect the distance of separation from the magnetic generator 16a based on a magnetic field generated by the magnetic generator 16a. The magnetic sensors 14b and 14d are configured to detect the distance of separation from the magnetic generator 16b based on a magnetic field generated by the magnetic generator 16b. This mode enables the determination device 18 to determine deformation due to vertical deflection, the lateral deformation, the twisting deformation 1, and the twisting deformation 2. In this manner, the arrangement of the magnetic sensor 14 and the magnetic generator 16 can be set to correspond to the type of deformation to be determined.

FIG. 8 is a diagram illustrating another example of an arrangement mode of the magnetic sensors 14a, 14c. FIG. 8 illustrates two magnetic sensors arranged in the bead-portion-corresponding region 10c on one side in the tire lateral direction to be at different positions in the tire circumferential direction. In such a case, the magnetic sensors 14a, 14c can be provided on a single common substrate.

Figure 9A:
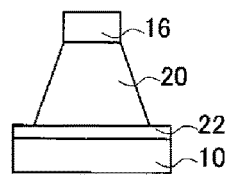
FIGS. 9A to 9D are diagrams illustrating a method of attaching a magnetic generator and a magnetic sensor according to an embodiment.
Figure 9B:
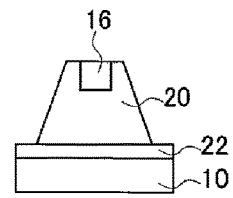
Figure 9C:
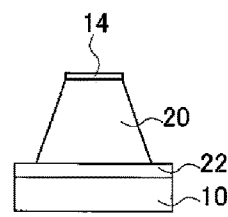
Figure 9D:
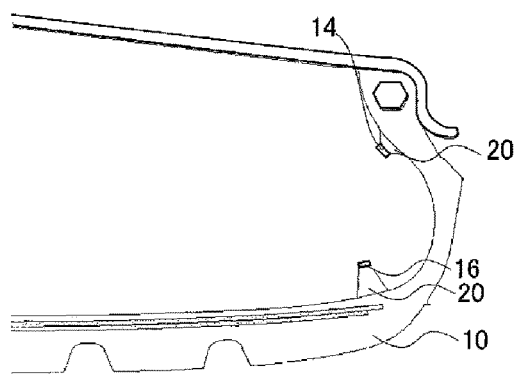

FIGS. 9A to 9D are diagrams illustrating a method of attaching the magnetic generator 16 and the magnetic sensor 14 according to an embodiment. As illustrated in FIGS. 9A to (c), the magnetic generator 16 and the magnetic sensor 14 are attached to the tread-portion-corresponding region 10b and the bead-portion-corresponding region 10c in the tire inner surface, via bases 20 that are fixed using a fixing member 22 such as an adhesion layer or a hook-and-loop fastener. The magnetic generator 16 may be fixed to a surface of the base 20 as illustrated in FIG. 9A, or may be fixed by being fit in a recess provided in the base 20 as illustrated in FIG. 9(b). The magnetic generator 16 and the magnetic sensor 14 are fixed via the base 20 in this manner so as to be separated from a component of the tire 10 such as a steel reinforcing cord, for the sake of improvement of the detection accuracy of the magnetic sensor 14. The distance between the magnetic generator 16 and the magnetic sensor 14 can be reduced as much as the heights of the bases 20 provided, meaning that the required intensity of the magnetic field 16 generated by the magnetic generator 16 can be reduced. The base 20 may be made of a rubber material. In such a case, the base 20 may be integrally molded with the tire 10, for example. The base 20 is made of a material that is lightweight and less likely to deform, so as not to be deformed by centrifugal force produced when the tire 10 rotates. The base 20 may also be fixed to the inner surface of the tire mechanically or by using adhesive. An example of the material that is lightweight and less likely to deform to be preferably used for the base 20 includes rigid urethane foam. In the example described above, the magnetic generator 16 and the magnetic sensor 14 are both attached to the tire inner surface via the bases 20. Alternatively, one of the magnetic generator 16 and the magnetic sensor 14 may be attached to the tire inner surface via the base 20.

Figure 10:
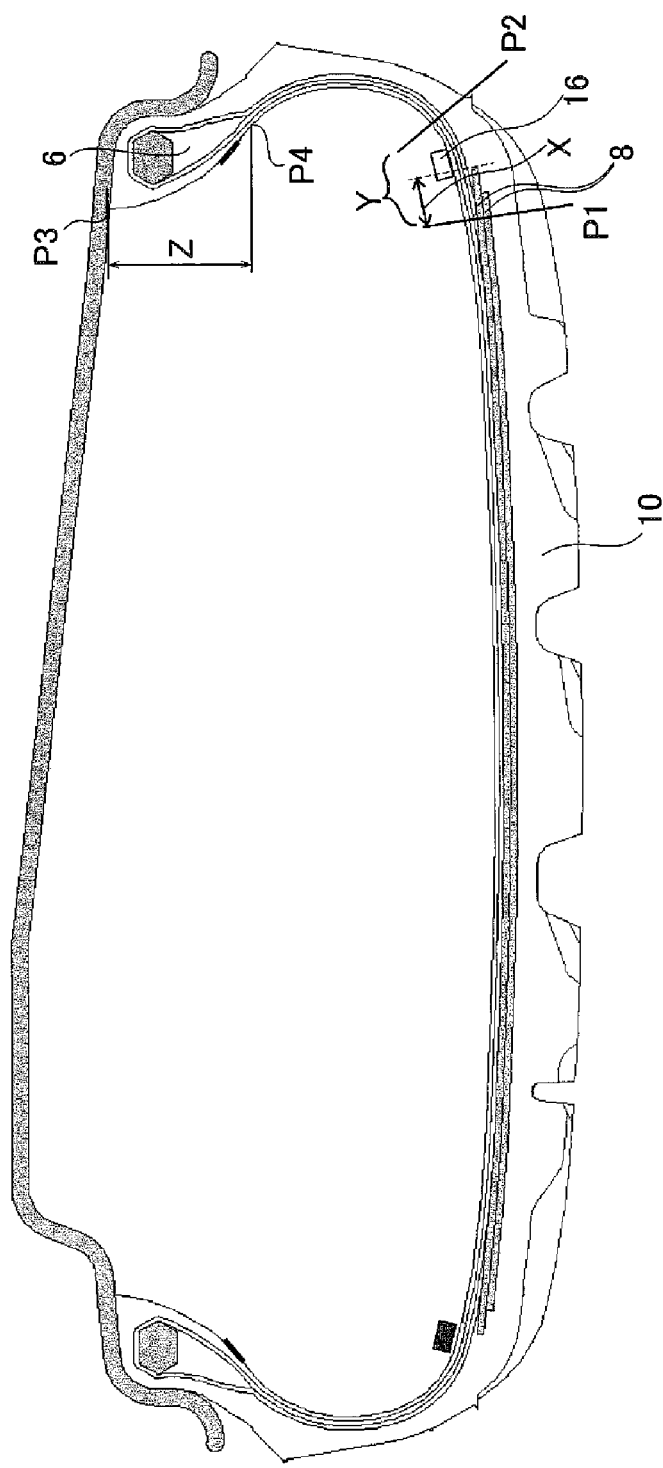
FIG. 10 is a diagram illustrating a range of arrangement positions of a magnetic generator and a magnetic sensor according to one embodiment.

FIG. 10 illustrates a preferable range in which the magnetic generator and the magnetic sensor are arranged, in a case where the magnetic generators 14a to 14d are provided in the tread-portion-corresponding region 10b to be close to the sidewall portions 2 as illustrated in FIG. 7A to (d).

The magnetic generator 16, in a set of the magnetic sensor 14 and the magnetic generator 16 on one side relative to the tire equator line in the tire lateral direction is preferably provided in a range Y (see FIG. 10) between a first corresponding position P1 and a second corresponding position P2 in the tire inner surface. The first corresponding position P1 is separated from a belt end that is the outermost portion of the belt 8 of the tire 10 in the tire lateral direction, toward the inner side in the tire lateral direction by X=30 mm. The second corresponding position P2 is in the tire inner surface corresponding to a pattern end of the tire 10. The range Y is within the tread-portion-corresponding region 10b. In this case, the magnetic sensor 14 is preferably within a range Z (see FIG. 10) in the inner surface. The range Z extends along the tire radial direction between a bead distal end P3 and a position P4. The bead distal end P3 is the innermost position of the tire 10 in the tire radial direction. The position P4 is at a height which is 35% of a tire cross-sectional height along the tire radial direction from the bead distal end P3. The tire cross-sectional height is length along the tire radial direction between the bead distal end P3 and the tire maximum outer diameter position (position on the tire equator line) of the tire 10. This length is measured with the tire 10 mounted on the regular rim described above, inflated to the regular internal pressure described above, and in an unloaded state.

It is also preferable to provide the magnetic sensor 14 and the magnetic generator 16 in the range Y and the range Z, respectively.

The range Z corresponds to a partially rigid portion of the tire 10 and thus involves small deformation when the tire 10 rotates. Thus, the magnetic sensor 14 or the magnetic generator 16 provided in the range Z is less likely to deform due to bending.

For the sake of durability, the magnetic sensor 14 or the magnetic generator 16 is preferably not provided in a side portion between the range Y and the range Z that largely bends when the tire 10 rotates. Furthermore, the magnetic sensor 14 or the magnetic generator 16 is preferably not provided in a shoulder portion in a contact patch region that is likely to be heated to be at a higher temperature. Thus, the magnetic sensor 14 or the magnetic generator 16 is preferably provided between the range Y between the shoulder portion and the side portion, so as not to be heated or have durability compromised.

Figure 11:
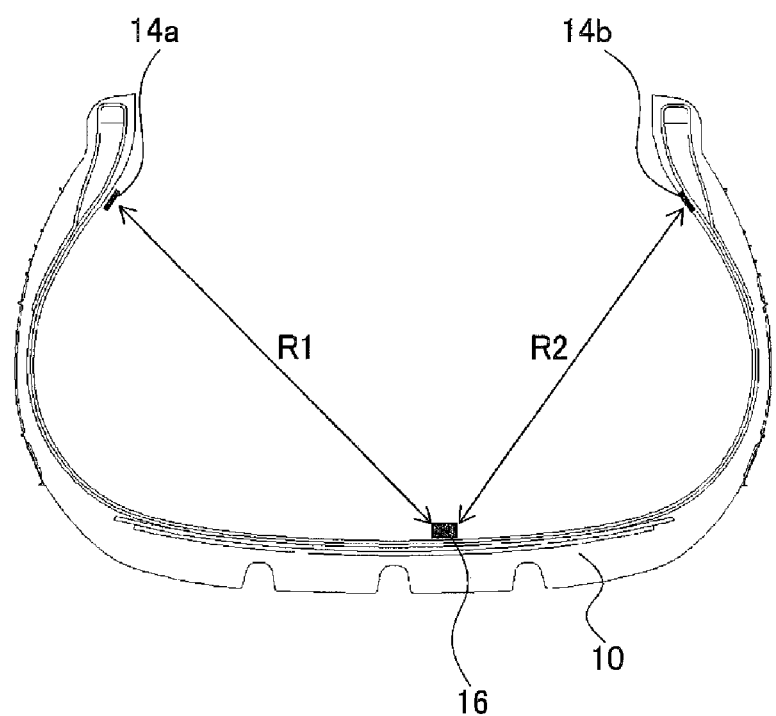
FIG. 11 is a diagram illustrating an example of an arrangement mode of magnetic sensors according to one embodiment.

FIG. 11 is a diagram illustrating an example of an arrangement mode of the magnetic sensor 16. FIG. 11 illustrates an example of an arrangement mode of the magnetic sensors 14, in a case where the two magnetic sensors 14a, 14b are provided in the respective bead-portion-corresponding regions 10c positioned on both side in the tire lateral direction and detect the distance from a single magnetic generator 16 based on the magnetic field generated by the magnetic generator 16.

According to one embodiment, a ratio R1/R2 is preferably equal to or more than 0.67 and equal to or less than 1.5, where R1 is a distance between positions of one magnetic sensor 14a and the magnetic generator 16 and R2 is a distance between positions of the other magnetic sensor 14b and the magnetic generator 16. The distance R1 and the distance R2 are distances in a state where the tire 10 is not deformed in the unloaded state.

When the magnetic sensors 14a, 14b of the same type are provided in the respective bead-portion-corresponding regions 10c facing each other, the magnetic generator 16 is preferably provided in a center portion of the tread-portion-corresponding region 10b so that measurement distance ranges of the magnetic sensors 14a, 14b can be substantially the same. Still, a main groove extending in the tire circumferential direction may be provided on or near the tire equator line of the tread portion. In such a case, the tread portion is likely to bend about the main groove to largely deform, during an operation of mounting the tire 10 on the wheel or an operation of removing the tire 10 from the wheel. In such a case, the center portion is not suitable for fixing the magnetic generator 16, and thus the magnetic generator 16 is preferably not fixed to the center portion. In such a case, the position of the magnetic generator 16 in the tire lateral direction is preferably shifted from a position on the tire equator line in the tread portion. In such a case, the ratio R1/R2 preferably has upper and lower limits set, to be equal to or more than 0.67 and equal to or less than 1.5. When the ratio R1/R2 is less than 0.67 or more than 1.5, the magnetic generator 16 is largely separated from the tire equator line, to be at a large distance from the magnetic sensors 14a, 14b, and thus might be outside an appropriate measurement distance range of any or both of the magnetic sensors. In view of this, the ratio R1/R2 is preferably equal to or more than 0.67 and equal to or less than 1.5.

Figure 12:
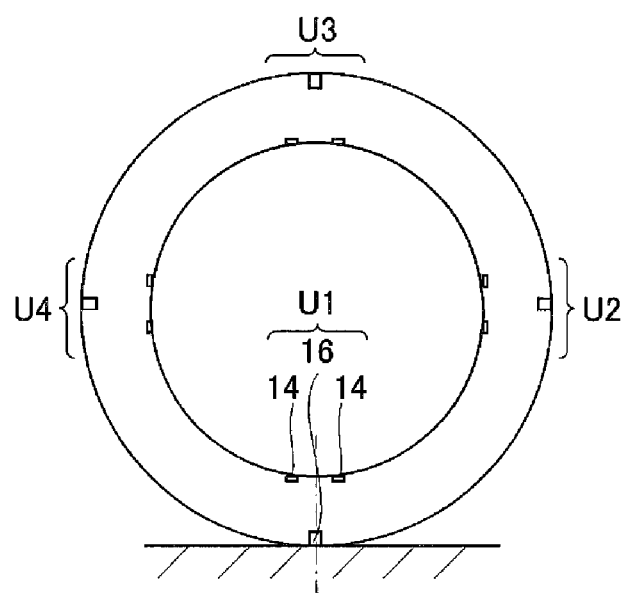
FIG. 12 is a diagram illustrating an example of an arrangement mode of sets of magnetic sensors and magnetic generators according to one embodiment.

FIGS. 4 to 11 illustrate various arrangement modes of the magnetic sensor 14 and the magnetic generator 16. Assuming that the magnetic sensor 14 and the magnetic generator 16 in these arrangement modes are provided as one set, this one set (first set) and one or more additional sets (second sets) of magnetic sensors and magnetic generators having similar configurations as the magnetic sensor 14 and the magnetic generator 16 are preferably provided at an equal interval along the tire circumferential direction as illustrated in FIG. 12. FIG. 12 is a diagram illustrating an arrangement of sets of magnetic sensors and magnetic generators according to one embodiment.

Deformation of the tire 10 is preferably determined for control while traveling at 100 km/h or faster. In view of this, the sets are provided at two to eight locations arranged at an equal interval along the tire circumferential direction. FIG. 12 illustrates an example where sets U1 to U4 are dispersedly arranged along the tire circumferential direction at an equal interval (90 degrees interval). In such a case, of the plurality of magnetic sensors 14, each of those arranged closest to the magnetic generator 16 in the adjacent set in the tire circumferential direction needs to be prevented from interfering with the magnetism from the magnetic generator 16 in the adjacent set in the tire circumferential direction. Thus, such a magnetic sensor 14 is preferably separated from the magnetic generator 16 in the adjacent set in the tire circumferential direction by a distance that is at least two times as long as the longest distance (distance in a non-ground contact state) between the magnetic generator 16 and the magnetic sensor 14 that are in the same set.

When the determination device 18 samples the detection signals from the magnetic sensors 14 at a timing where the magnetic generator 16 passes through the center position in the contact patch in the tire circumferential direction during the rotation of the tire 10, the tire 10 is preferably provided with a sensor for a rotational position of the tire 10 so that the position of the magnetic generator 16 can be recognized.

Figure 13:
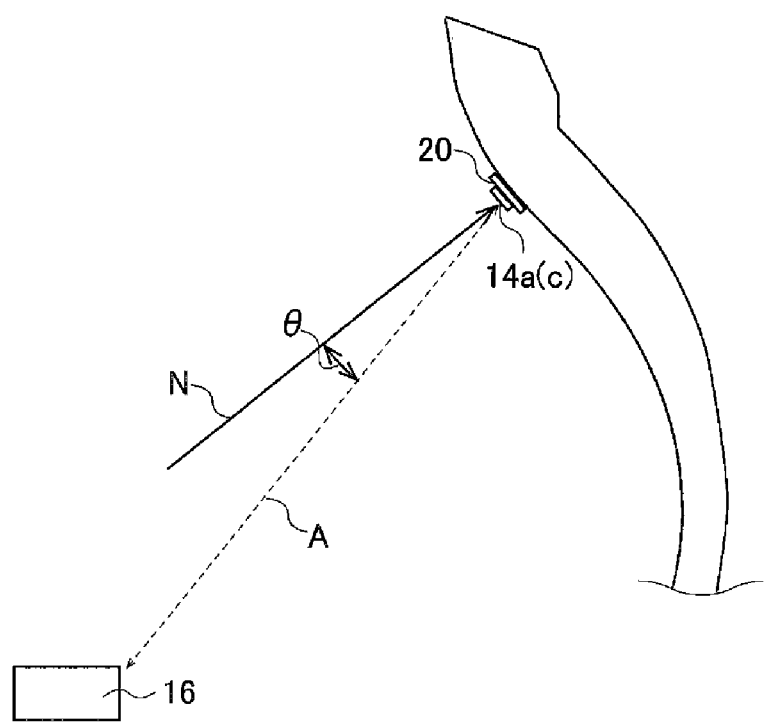
FIG. 13 is a diagram illustrating an example of an arrangement of magnetic sensors according to one embodiment.

FIG. 13 is a diagram illustrating an example of an arrangement mode of magnetic sensors according to one embodiment. The magnetic sensors 14a, 14c are preferably provided on the substrate 20, with an angle θ between a normal direction N of the substrate 20 and a straight line direction A connecting the magnetic generator 16 and the magnetic sensor 14a (14c) being 0 to 60 degrees In such a case, the angle θ is measured with the tire 10 mounted on the regular rim described above, inflated to the regular internal pressure described above, and in the unloaded state. The normal direction N is a direction in which the magnetic sensors 14a, 14c detect the magnetism. When the angle θ is 0 to 60 degrees, the information about the distance between the magnetic generator 16 and the magnetic sensors 14a, 14c can be detected with high sensitivity against magnetism. Thus, highly accurate determination with small noise can be achieved by the determination device 18.

In the embodiment, the magnetic sensor 14 is provided in the bead-portion-corresponding region 10c, and the magnetic generator 16 is provided in the tread-portion-corresponding region 10b, preferably to be in a contact-patch-corresponding region corresponding to the contact patch. Alternatively, the magnetic sensor 14 may be provided in the tread-portion-corresponding region 10b preferably to be in the contact-patch-corresponding region corresponding to the contact patch, and the magnetic generator 16 may be provided in the bead-portion-corresponding region 10c. Still, the magnetic sensor 14 and a related circuit are preferably provided in the bead-portion-corresponding region 10c rather than being provided in the tread-portion-corresponding region 10b, because the tread portion 1 is likely to be at a high temperature while the tire 10 is rotating.

Note that the magnetic generator 16 is preferably provided in a land-portion-corresponding region corresponding to a land portion in the contact-patch-corresponding region in the tread-portion-corresponding region 10b corresponding to the contact patch. The land portion is a portion where the tread portion 1 contacts a road surface. The land-portion-corresponding portion is deviated from the tire circumferential direction groove that is provided in the tread portion 1 and extends in the circumferential direction. When the magnetic generator 16 is provided in a region of the contact-patch-corresponding region including the circumferential direction main groove, the magnetic generator 16 passing through the contact patch might have the orientation changed because a large local deformation may occur in the circumferential direction main groove. This has a negative impact on the distribution of the magnetic field, resulting in a higher risk of the information about the distance detected by the magnetic sensors 14a to 14c varying. In view of this, the magnetic generator 16 is preferably provided in the land-portion-corresponding region corresponding to the land portion.

In the embodiment described above, the deformation mode of the sidewall portion 2 is determined by using the magnetic sensors 14a, 14b arranged in the two respective bead-portion-corresponding regions 10c on both sides of a single magnetic generator 16 in the tread-portion-corresponding region 10b, in the tire lateral direction. This arrangement involves a risk of failure to acquire highly accurate distance information in a case of a tire having a large size with distances La0 and Lb0 between the magnetic generator 16 and the magnetic sensors 14a, 14b being large. In such a case, as illustrated in FIGS. 7A to (d), the magnetic generators 16 corresponding to the respective magnetic sensors 14 provided in the two respective bead-portion-corresponding regions 10c, may be provided in the tread-portion-corresponding region 10b. In such a case, the two magnetic generators 16 are preferably arranged in the ranges Y in the tread-portion-corresponding region 10b that are around the shoulders of the tread portion 1.

As described above, the tire 10 is provided with the measurement unit including the magnetic generator 16 and the magnetic sensor 14, with the magnetic generator 16 provided in one (first region) of the tread-portion-corresponding region 10b and the bead-portion-corresponding region 10c and the magnetic sensor 14 provided in the other one (second region) of the tread-portion-corresponding region 10b and the bead-portion-corresponding region 10c. Thus, the deformation mode of the sidewall portion 2 can be determined based on the distance between the magnetic sensor 14 and the magnetic generator 16.

As illustrated in FIGS. 4A and 4B, the magnetic sensors 14a, 14b are provided in the respective bead-portion-corresponding regions 10c on both sides in the tire lateral direction, to be at two different positions in the tire circumferential direction. The magnetic sensor 16 is provided between the two positions of the magnetic sensors 14 in the tire circumferential direction. Thus, the vertical deformation, the lateral deformation, or the twisting deformation about the tire rotational axis of the sidewall portion 2 can be determined.

By providing a set including two magnetic sensors and the magnetic generator 16, as well as one or more such sets at an equal interval along the tire circumferential direction, the deformation of the sidewall portion 2 can be determined in detail, allowing effective control of a vehicle.

The magnetic generator 16 is provided in the contact-patch-corresponding region, in the inner surface of the tire, corresponding to the contact patch of the tread portion 1, and the two magnetic sensors are provided in the bead-portion-corresponding regions 10c. The distance between the magnetic generator 16 and the magnetic sensors 14 can be detected with the two magnetic sensors 14 used for a single magnetic generator 16, whereby the deformation of the sidewall portion 2 can be determined efficiently.

The magnetic generator 16 is provided in the land-portion-corresponding region, in the contact-patch-corresponding region, corresponding the land portion where the tread portion 1 contacts a road surface, so that the deformation of the sidewall portion 2 can be accurately determined without being affected by minute recesses and protrusions in the tread-portion-corresponding region 10b.

Figure 14:
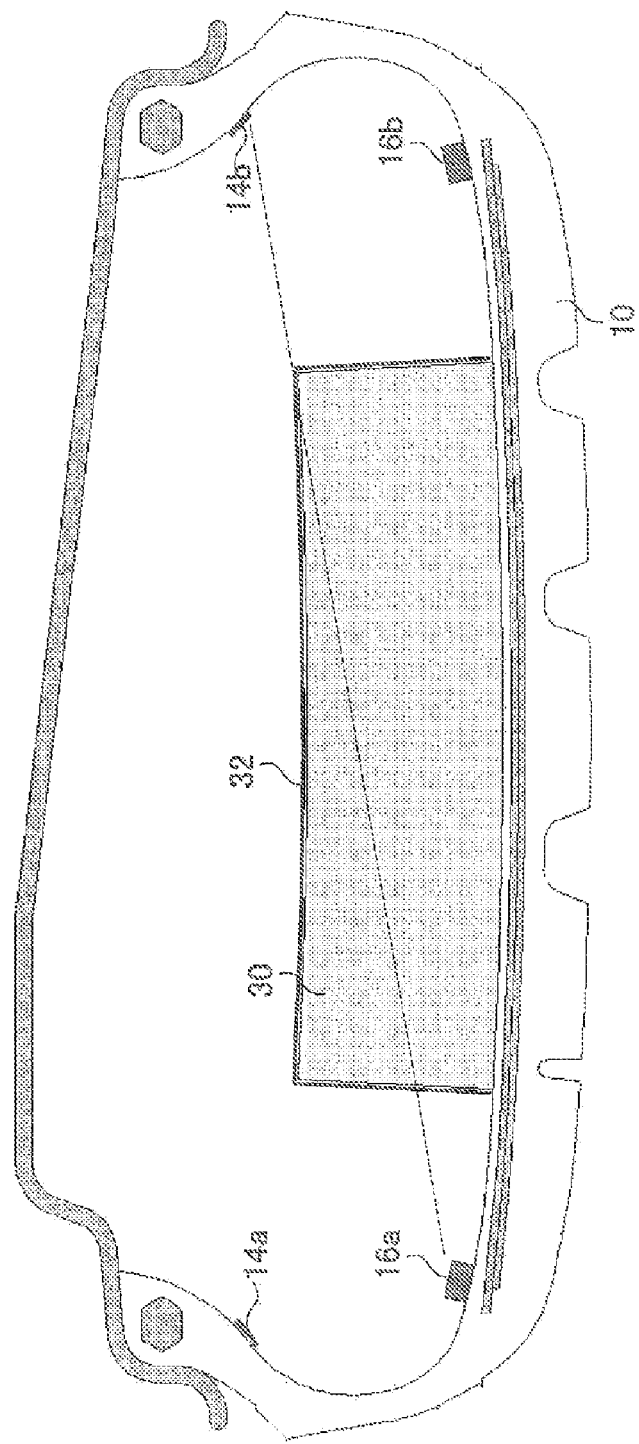
FIG. 14 is a diagram illustrating an example of an arrangement mode of a sound absorbing member, magnetic sensors, and magnetic generators according to one embodiment.

According to one embodiment, a sound absorbing member may be provided on the inner surface of the tire 10 to suppress sound pressure vibration of air in the tire cavity region of the tire 10. FIGS. 14 and 15 are diagrams illustrating an example of an arrangement mode of the sound absorbing member, the magnetic sensors 14, and the magnetic generators 16. FIG. 14 illustrates an example where a sound absorbing member 32 that is made of foamed urethane resin and serves as a sound absorbing member 30 is fixed to the tread-portion-corresponding region 10b. Here, a set A of the magnetic sensor 14a and the magnetic generator 16a and a set B of the magnetic sensor 14b and the magnetic generator 16b are provided on sides of the inner surface of the tire 10 facing each other in the tire lateral direction. In this case, the sound absorbing member 30 is preferably provided with a magnetic field shielding material 32 so that mixing of the magnetic field between the respective sets A and B is less likely to occur.

The magnetic field shielding material 32 may be included in the material of the sound absorbing member 30, or the magnetic field shielding material 32 may be formed as a film on the surface of the sound absorbing member 30 as illustrated in FIG. 14. The magnetic field shielding material 32 is a magnetic material such as metal or a carbon fiber material. With this configuration, the mixing of the magnetic fields between the sets A and B is less likely to occur.

In this case, the magnetic field shielding material 32 is preferably partially provided at least in a region of the sound absorbing member 30, the region extending on a straight line that connects the position of the magnetic generator 16a in the set A and the position of the magnetic sensor 14b in the set B and in a region of the sound absorbing member 30, the region extending on a straight line that connects the position of the magnetic generator 16b in the set B and the position of the magnetic sensor 14a in the set A. The magnetic field shielding material 32 serving as a covering film leads to a small region of contact between the sound absorbing member 30 and air in the tire cavity region, which is likely to result in a small sound absorbing effect. Thus, the magnetic field shielding material 32 in a form of a film is preferably partially provided on the sound absorbing member 30.

FIGS. 15A and (b) are diagrams illustrating various arrangement modes of the magnetic field shielding material 32. FIG. 15A illustrates a mode in which the magnetic field shielding material 32 in a form of a film is provided in a region of the sound absorbing member 30, the region extending on a straight line that connects the position of the magnetic generator 16a in the set A and the position of the magnetic sensor 14b in the set B and in a region of the sound absorbing member 30, the region extending on a straight line that connects the position of the magnetic generator 16b in the set B and the position of the magnetic sensor 14a in the set A. According to this mode, the magnetic field shielding material 32 is provided in a part of the upper surface of the sound absorbing member 30. FIG. 15B also illustrates a mode in which the magnetic field shielding material 32 in a form of a film is provided in a region of the sound absorbing member 30, the region extending on a straight line that connects the position of the magnetic generator 16a in the set A and the position of the magnetic sensor 14b in the set B and in a region of the sound absorbing member 30, the region extending on a straight line that connects the position of the magnetic generator 16b in the set B and the position of the magnetic sensor 14a in the set A. According to the mode, two sound absorbing members 30 are provided on both sides of the tire equator line. The magnetic field shielding materials 32 in a form of a film are provided in parts of side surfaces of the two respective sound absorbing members 30.

With the sound absorbing member 30 thus provided with the magnetic field shielding material 32, a mixture of the magnetic fields generated by the magnetic generator 16a and 16b is less likely to be detected by the magnetic sensors 14a, 14b.

The foregoing has been a detailed description of the tire assembly and the tire deformation state determination system according to an embodiment of the present technology. However, the present technology is naturally not limited to the above embodiments, but may be improved or modified in various ways within the scope of the present technology.

The invention claimed is:

1. A tire assembly that comprises a first magnetic sensor configured to acquire a deformation state of a sidewall of a tire, the tire assembly comprising:
    a tire; and
    at least one measurement unit provided with a first-magnetic generator and a first magnetic sensor configured to acquire the deformation state of the sidewall, the first magnetic generator being provided in a first region that is any one of a contact-patch-corresponding region and bead-portion-corresponding regions that are on an inner surface of the tire, the contact-patch-corresponding region corresponding to a contact patch of a tread portion of the tire and the bead-portion-corresponding regions corresponding to bead portions of the tire, the first magnetic sensor being provided in a second region that is one of the contact-patch-corresponding region and the bead-portion-corresponding regions and other than the first region, where the first magnetic sensor detects a distance of separation from the magnetic generator based on a magnetic field generated by the magnetic generator,
    the magnetic sensor comprising a plurality of magnetic sensors, the plurality of magnetic sensors comprising first and second magnetic sensors disposed in the bead-portion-corresponding regions on both sides in a tire lateral direction or the first and second magnetic sensors disposed in a same bead-portion-corresponding region at positions different from each other in a tire circumferential direction, and
    the magnetic sensor disposed on each of the positions being configured to detect distances of separation from the magnetic generator, based on a common magnetic field generated by the magnetic generator.

2. The tire assembly according to claim 1, further comprising one or more additional measurement units comprising one or more additional sets of magnetic sensors and magnetic generators having similar configurations as the magnetic sensor and the first-magnetic generator are provided in the first region and the second region, and the at least one measurement unit and the one or more additional measurement units are provided at an equal interval along the tire circumferential direction.

3. The tire assembly according to claim 1, wherein
    the magnetic generator is provided in the contact-patch-corresponding region, and
    the first and second magnetic sensors are is disposed on each of two positions in the bead-portion-corresponding regions on both sides in-a the tire lateral direction.

4. The tire assembly according to claim 3, wherein R1 is a distance between a position of the first magnetic sensor in one of the bead-portion-corresponding regions on one of the sides in the tire lateral direction and a position of the first magnetic generator, R2 is a distance between a position of the second magnetic sensor provided in one of the bead-portion-corresponding regions on an other one of the sides in the tire lateral direction and the position of the magnetic generator, and a ratio R1/R2 is equal to or greater than 0.67 and equal to or less than 1.5.

5. The tire assembly according to claim 3, wherein a position of the magnetic sensor in-a the tire circumferential direction is identical to a position of the magnetic generator in the tire circumferential direction.

6. The tire assembly according to claim 3, wherein
    positions of the first and second magnetic sensors are different from each other in the tire circumferential direction, and
    the magnetic generator is provided between the positions of the first and second magnetic sensors in the tire circumferential direction.

7. The tire assembly according to claim 3, wherein
    the first and second magnetic sensors are disposed in the bead-portion-corresponding regions on both sides in the tire lateral direction at a same position in the tire circumferential direction.

8. The tire assembly according to claim 1, wherein
the first and second magnetic sensors are provided in the same bead-portion-corresponding region at the positions different from each other in the tire circumferential direction, and
the magnetic generator is provided in the contact-patch-corresponding region between the positions of the first and second magnetic sensors in the tire circumferential direction.

9. The tire assembly according to claim 1, wherein the first magnetic generator is provided in a land-portion-corresponding region corresponding to a land portion where the tread portion contacts a road surface.

10. The tire assembly according to claim 1, wherein
the first and second magnetic sensors and the first-magnetic generator are provided on one side of an equator line of the tire in the tire lateral direction,
a first device that is one of the first magnetic sensor, the second magnetic sensor or the magnetic generator is provided within a range between a first corresponding position on the inner surface of the tire and a second corresponding position on the inner surface of the tire, the first corresponding position being separated from a belt end that is an outermost portion of a belt of the tire in the tire lateral direction, toward an inner side in the tire lateral direction by 30 mm, the second corresponding position corresponding to a pattern end of the tire, and
a second device that is one of the first magnetic sensor, the second magnetic sensor and the magnetic generator and other than the first device is provided within a range in the inner surface along a tire radial direction, between a bead distal end that is an innermost position of the tire in the tire radial direction and a position at a height that is 35% of a tire cross-sectional height from the bead distal end in the tire radial direction.

11. The tire assembly according to claim 10, wherein a sound absorbing member made of foamed urethane resin is fixed to the contact-patch-corresponding region,
the at least one measurement unit comprises a plurality of measurement units provided at sides of the inner surface of the tire opposite to each other in the tire lateral direction respectively, and
the sound absorbing member is provided with a magnetic field shielding material that avoids mixing magnetic fields corresponding to the plurality of measurement units.

12. The tire assembly according to claim 11, wherein the magnetic field shielding material is provided at least in a first region of the sound absorbing member, the first region extending on a straight line that connects a position of the first magnetic generator of one of the measurement units and a position of the third magnetic sensor of an other one of the measurement units, and in a second region of the sound absorbing member, the second region extending on a straight line that connects a position of the magnetic generator of the other one of the measurement units and a position of the first or second magnetic sensor of the one of the measurement units.

13. The tire assembly according to claim 1, wherein at least one device of the magnetic generator, the first magnetic sensor and the second magnetic sensor is fixed to one of the contact-patch-corresponding region and the bead-portion-corresponding regions via a base.

14. The tire assembly according to claim 1, wherein
the first and second magnetic sensors are provided on substrates, and an angle between a normal direction of the substrates and a straight line direction connecting the magnetic generator and the first and second magnetic sensors is 0 to 60 degrees.

15. The tire assembly according to claim 1, wherein the magnetic sensor is configured to output a detection signal indicating the distance.

16. The tire assembly according to claim 1, wherein
the magnetic generator is a single magnetic generator, and
no magnetic generator other than the single magnetic generator is provided in the at least one measurement unit.

17. The tire assembly according to claim 1, wherein
the first and second magnetic sensors are disposed within a range Z in the inner surface, the range Z extending along a tire radial direction between a bead distal end P3 of each of the bead portions and a position P4, the bead distal end P3 being an innermost position of the tire in the tire radial direction, and the position P4 being at a height which is 35% of a tire cross-sectional height along the tire radial direction from the bead distal end P3.

18. A tire deformation state determination system comprising:
the tire assembly, and
a determination device configured to determine a deformation state of the sidewall of the tire based on a detection signal output from the magnetic sensor,
the tire assembly comprising:
a tire; and
a measurement unit provided with a magnetic generator and a magnetic sensor configured to acquire the deformation state of the sidewall, the magnetic generator being provided in a first region that is any one of a contact-patch-corresponding region and bead-portion-corresponding regions that are on an inner surface of the tire, the contact-patch-corresponding region corresponding to a contact patch of a tread portion of the tire and the bead-portion-corresponding regions corresponding to bead portions of the tire, the magnetic sensor being provided in a second region that is one of the contact-patch-corresponding region and the bead-portion-corresponding regions and other than the first region, where the magnetic sensor detects a distance of separation from the magnetic generator based on a magnetic field generated by the magnetic generator,
the magnetic sensor comprising a plurality of magnetic sensors, the plurality of magnetic sensors comprising first and second magnetic sensors disposed in the bead-portion-corresponding regions on both sides in a tire lateral direction or the first and second magnetic sensors disposed in a same bead-portion-corresponding region at positions different from each other in a tire circumferential direction, and
the magnetic sensor disposed on each of the two porisitions being configured to detect distances of separation from the magnetic generator, based on a common magnetic field generated by the magnetic generator.

19. The tire deformation state determination system according to claim 18, wherein the determination device is configured to determine, as the deformation state of the sidewall, at least one type of deformation including: vertical deformation corresponding to vertical deflection of the sidewall; lateral deformation corresponding to deformation of the sidewall in the tire lateral direction; twisting deformation of the sidewall due to the tread portion being twisted about a tire rotational axis; and twisting deformation of the sidewall due to the tread portion being twisted about an axis orthogonal to a contact patch of the tire and orthogonal to the tire rotational axis.

20. A tire assembly that comprises a magnetic sensor configured to acquire a deformation state of a sidewall of a tire, the tire assembly comprising;
   a tire; and
   a measurement unit provided with a magnetic generator and a group of magnetic sensors configured to acquire the deformation state of the sidewall, the magnetic generator being provided in a contact-patch-corresponding region that is on an inner surface of the tire and corresponds to a contact patch of a tread portion of the tire, the group of magnetic sensors being provided in bead-portion-corresponding regions that are on the inner surface of the tire and correspond to bead portions of the tire, where the group of magnetic sensors detects a distance of separation from the magnetic generator based on a magnetic field generated by the magnetic generator,
   the group of magnetic sensors comprising at least a first magnetic sensor, a second magnetic sensor, and a third magnetic sensor, the first magnetic sensor and the second magnetic sensor being provided in one of the bead-portion-corresponding regions on one side in a tire lateral direction, the third magnetic sensor being provided in one of the bead-portion-corresponding regions on an other side in the tire lateral direction, the first magnetic sensor and the second magnetic sensor being provided on different sides in a tire circumferential direction with respect to a position of the magnetic generator in the circumferential direction, and
   the first magnetic sensor, the second magnetic sensor and the third magnetic sensor detecting distances of separation from the first magnetic generator, based on a common magnetic field generated by the first magnetic generator.

21. A tire deformation state determination system comprising:
   the tire assembly according to claim 20, and
   a determination device configured to determine a deformation state of the sidewall of the tire based on a detection signal output from the group of magnetic sensors.

22. The tire deformation state determination system according to claim 21, wherein the determination device is configured to determine, as the deformation state of the sidewall, at least one type of deformation including: vertical deformation corresponding to vertical deflection of the sidewall; lateral deformation corresponding to deformation of the sidewall in the tire lateral direction; twisting deformation of the sidewall due to the tread portion being twisted about a tire rotational axis; and twisting deformation of the sidewall due to the tread portion being twisted about an axis orthogonal to a contact patch of the tire and orthogonal to the tire rotational axis.

* * * * *